(12) United States Patent
Patey et al.

(10) Patent No.: US 9,860,068 B2
(45) Date of Patent: Jan. 2, 2018

(54) SIGNATURE WITH PSEUDONYM FOR CHIP CARD

(71) Applicant: MORPHO, Issy-les-Moulineaux (FR)

(72) Inventors: Alain Patey, Issy-les-Moulineaux (FR); Hervé Chabanne, Issy-les-Moulineaux (FR); Julien Bringer, Issy-les-Moulineaux (FR); Roch Lescuyer, Issy-les-Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 50 days.

(21) Appl. No.: 15/033,489

(22) PCT Filed: Oct. 30, 2014

(86) PCT No.: PCT/EP2014/073402
§ 371 (c)(1),
(2) Date: Apr. 29, 2016

(87) PCT Pub. No.: WO2015/063241
PCT Pub. Date: May 7, 2015

(65) Prior Publication Data
US 2016/0294560 A1    Oct. 6, 2016

(30) Foreign Application Priority Data
Oct. 31, 2013 (FR) ...................... 13 60726

(51) Int. Cl.
*H04L 29/00* (2006.01)
*H04L 9/32* (2006.01)
*H04L 9/30* (2006.01)

(52) U.S. Cl.
CPC .......... *H04L 9/3247* (2013.01); *H04L 9/3073* (2013.01); *H04L 2209/42* (2013.01); *H04L 2209/76* (2013.01); *H04L 2209/805* (2013.01)

(58) Field of Classification Search
CPC .. H04L 9/3247; H04L 9/3073; H04L 2209/42
USPC ......................................................... 713/176
See application file for complete search history.

(56) References Cited

PUBLICATIONS

Javier Lopez, Xinyi Huang, Ravi Sandhu/ Network and System Security/ Jun. 2013/ Springer/ pp. 649-655.*

* cited by examiner

*Primary Examiner* — Brandon Hoffman
*Assistant Examiner* — Michael D Anderson
(74) *Attorney, Agent, or Firm* — Blakely Sokoloff Taylor & Zafman LLP

(57) ABSTRACT

The invention relates to a method of signature with pseudonym σ of a message m by a user device storing a secret signature key sk dependent at least on a first part of key f, on a second part of key x and on a third part of key A equal to $(g_1 h^f)^{1/(x+y)}$ and comprising the following steps: —generation of a pseudonym nym equal to $h^f dpk^x$, with dpk a public domain parameter, —determination of random numbers a, r_a, r_f, r_x, r_b, r_d, —calculation of signature coefficients $R_1$ equal to $h^{r\_f} dpk^{r\_x}$, $R_2$ equal to $nym^{r\_a} h^{-r\_d} dpk^{-r\_b}$, $R_3$ equal to $Z^{r\_x} V^{a-r\_x-r\_f-r\_b} W^{-r\_a}$, with Z, V and W respectively equal to $e(A, g_2)$, $e(h, g_2)$ and $e(h,w)$, —obtaining of a first signature parameter T equal to $Ah^a$, —calculation of a second signature parameter c by applying a cryptographic hash function H, to the public domain parameter dpk, to the pseudonym nym, to the first signature parameter T, to the signature coefficients $R_1$, $R_2$, $R_3$ and to the message m, —calculation of signature parameters s_f, s_x, s_a, s_b, s_d, respectively equal to r_f+c.f, r_x+c.x, r_a+c.a, r_b+c.a.x and r_d+c.a.f, —generation of said signature with pseudonym σ of said message m on the basis of said signature parameters.

15 Claims, 5 Drawing Sheets

SIGNATURE WITH PSEUDONYM FOR CHIP CARD

FIELD OF THE INVENTION

The present invention generally relates to the field of digital signatures.

The invention relates more precisely to a novel signing process with use of pseudonyms ("pseudonymous signatures"), for authentication purposes.

It applies quite particularly to identity documents, in particular travel documents readable by machine (Machine Readable Travel Document, MRTD) such as passports or identity cards comprising a chip and allowing a user to authenticate to a service provider through of a reader.

STATE OF THE ART

As illustrated in FIG. 1, for a holder of an identity document D.U of MRTD type to be able to access a service proposed by a service provider, a connection is set up between the identity document and a terminal of the service provider SFS through a reading terminal T and various security mechanisms are put in place.

Among these mechanisms, the PACE protocol (Password Authenticated Connection Establishment) allows setting up a secure channel between the identity document D.U and the reading terminal T once the owner of the identity document has entered a password, and the EAC protocol (Extended Access Control) allows the identity document and the service provider to reciprocally authenticate and set up another secure channel.

Moreover, the RI protocol (Restricted Identification) allows generating a pseudonym specific to an identity document for a given domain combining a set of terminals of the service provider SFS. This pseudonym allows said terminals to identify the identity document. Also, this protocol satisfies the property of "cross-domain anonymity": it is impossible to set up a link between the pseudonyms used for different domains for the same identity document.

These protocols are described in the reference: "Advanced security mechanisms for machine readable travel documents", part 2, Extended Access Control version 2 (EACv2), Password Authenticated Connection Establishment (PACE), and Restricted Identification (RI). Tech. Rep. TR-03110-2, BSI (March 2012), version 2.10.

This protocol can be extended to the use of such pseudonyms for digitally signing a message. Such a variant of this protocol is described in the reference Bender, J., Dagdelen, O., Fischlin, M., Kugler, D.: *Domain specific pseudonymous signatures for the German identity card*. In: Gollmann, D., Freiling, F. C. (eds.) *ISC. Lecture Notes in Computer Science*, vol. 7483, pp. 104-119, Springer (2012) and proposes that each user hold a secret element, called a signature key, generated by a key managing authority from his own secret key, and that this secret element be used both for signing messages sent and for generating the pseudonym used by this user. This protocol allows ensuring that the user has a valid and nonrevoked signature key, and that the pseudonym used is legitimate.

Such a protocol verifies the three following properties: "unforgeability", "cross-domain anonymity" and "seclusiveness".

The property of "unforgeability" ensures that it is impossible for anyone to generate a signature in place of a holder of an identity document.

The property of "seclusiveness" ensures that it is impossible for anyone to generate a valid signature without being a user having a valid identity document.

Nonetheless this protocol is based on the hypothesis that users cannot recover their signature key, this key being supposed to be stored on an inviolable chip of an identity document. Indeed, the pooling by at least two users of their signature keys would allows them to find the secret key of the key-managing authority and therefore generate new valid keys.

There is therefore a need to propose a secure signature mechanism even in the event of collection and pooling of signature keys of several users.

On the other hand, this protocol also supposes that the key managing authority does not store signature keys generated for users, once they are delivered. Indeed, knowledge of keys by the key-managing authority would allow it to use them to sign a message in place of any legitimate user. However, the absence of storage of these keys by the key-managing authority is difficult to guarantee.

There is therefore also a need to propose a signature mechanism ensuring that no authority can sign a message in place of a user.

Also, another known signature mechanism is that of the group signature, such as described in the reference Bringer, J. Patey, A.: *VLR group signatures—how to achieve both backward unlinkability and efficient revocation checks*. In: SECRYPT. pp. 215-220 (2012). The latter allows a member of a group to sign a message anonymously in the name of the group and prove that this member belongs to this group.

It provides associating a group secret with members of a group. It also provides associating with each member of the group a secret key composed of a first key part generated by the member and a second key part based both on the first key part and on the group secret. The signing of a message or challenge by a member with his to secret key allows him to prove that he is a member of the group while remaining to anonymous.

Nonetheless such a mechanism does not let a member of the group have an identity in this group.

The following references also describe group signature mechanisms: David Chaum, Eugene van Heyst: Group Signatures. EUROCRYPT 1991:257-265 and Dan Boneh, Hovav Shacham: Group signatures with verifierlocal revocation. ACM Conference on Computer and Communications Security 2004:168-177.

French patent application No. 1352650 proposes a pseudonym group signing method allowing a member of a group to sign a message in the name of the group while having an identity in the group. This method does not have the disadvantages of the signature mechanisms using pseudonyms mentioned hereinabove Indeed, knowledge of their secret key by the members of a group does not allow them to pass themselves off as the managing authority. Moreover, the managing authority has no knowledge of part of the secret key of each member of the group and therefore cannot sign messages by passing himself off as a member.

However, implementing such a method requires execution of complex calculations by the identity document during signing of a message. However, existing identity documents generally comprise an electronic chip having low calculating power. The incapacity to execute or very long execution duration of such calculations on this type of chip therefore make this method incompatible with existing identity documents.

Therefore there is a need for a pseudonym signing method allowing a user to authenticate to a service provider, while having a level of security at least as high as that of signature methods of the state of the art, and requiring only low calculation power for executing the signing of the signatory, so that such a pseudonym signing method can be implemented by existing identity documents.

SUMMARY OF THE INVENTION

For this purpose, the present invention thus relates according to a first aspect to a pseudonym signing method a of a message m by a user device comprising processing means, interface means and storage means,
the storage means of said user device storing a secret signature key sk function at least:
  of a modular integer f constituting a first key part,
  of a modular integer x constituting a second key part,
  of a third key part A equal to $(g_1 h^f)^{1/(x+\gamma)}$ with:
    $g_1$ and h first and second elements of a group $G_1$, said first and second elements $g_1$ and h of the group $G_1$ being public parameters and,
    $g_2$ an element of a group $G_2$, said element $g_2$ of the group $G_2$ being a public parameter,
    $\gamma$ a modular integer constituting a secret management key, such as w equal to $g_2^\gamma$ with w a public parameter,
and comprising the following steps implemented by the processing means of said user device:
  generating a pseudonym nym identifying the user of said user device and equal to $h^f dpk^x$, with dpk a public domain parameter,
  determining first, second, third, fourth, fifth and sixth modular random integers a, r_a, r_f, r_x, r_b, r_d,
  calculating a first signing coefficient $R_1$ equal to $h^{r\_f} dpk^{r\_x}$,
  calculating of a second signing coefficient $R_2$ equal to $nym^{r\_a} h^{-r\_d} dpk^{-r\_b}$,
  obtaining a third signing coefficient $R_3$ equal to $Z^{r\_x} V^{a.r\_x - r\_f - r\_b} W^{-r\_a}$
with Z, V and W first, second and third coupling results respectively equal to $e(A, g_2)$, $e(h, g_2)$ and $e(h,w)$,
and e a bilinear application of $G_1 \times G_2$ in a group $G_T$, said application e being a public parameter,
  obtaining a first signing parameter T equal to $Ah^a$,
  calculating a second signing parameter c by applying a cryptographic hash function H, to the public domain parameter dpk, to the pseudonym nym, to the first signing parameter T, to the first, second and third signing coefficients $R_1$, $R_2$, $R_3$ and to the message m,
  calculating third, fourth, fifth, sixth and seventh signing parameters s_f, s_x, s_a, s_b, s_d, respectively equal to r_f+c.f, r_x+c.x, r_a+c.a, r_b+c.a.x and r_d+c.a.f,
  generating said pseudonym signature σ of said message m from said signing parameters T, c, s_f, s_x, s_a, s_b and s_d.

Such a signing method allows a user to prove his knowledge of the secret management key and sign with a pseudonym which is his own, with a level of security at least equal to that offered by existing signature methods, and which limits the quantity of calculations to be made on the user device.

The pseudonym signing method according to the first aspect can comprise a generation step of at least one element of the first key part f by the processing means of the user device, a transmission step by the interface means of the user device of an identity datum generated from said at least one generated element of said first key part, so as to prove by a with zero knowledge proof algorithm, to a key-managing authority the knowledge by the user device of said at least one generated element of the first key part, a reception step by the interface means of the user device of the second x and third A key parts generated by the key managing authority.

This allows the user to prove to the key management server his knowledge of the first part of his secret key without revealing it all. The user device thus remains the sole owner of all of its secret key. In the event where the first key part comprises a first element generated by the user device and a second element generated by the key management server, this method allows increasing the level of security by jointly generating the first key part by the user device and the management server.

In an embodiment of the signing method according to the first aspect, the first coupling result Z and/or the second and third coupling results V and W are calculated prior to the step of obtaining the third signing coefficient $R_3$.

This allows accelerating the calculation of the signature by precalculating these elements.

The second and third coupling results V and W can be public parameters.

This allows user devices wanting to verify a signature to have these coupling results available without having to take charge of their calculation.

The pseudonym signing method according to the first aspect can comprise a reception step, by the interface means of the user device, of the first coupling result Z calculated by a processing unit of a management server of a key-managing authority.

This allows diminishing the quantity of calculations made by the user device.

In a first variant embodiment, the step of obtaining the first signing parameter T of the signing method according to the first aspect can comprise a calculation step of the first signing parameter T implemented by the processing means of the user device.

This allows limiting the quantity of data to be exchanged by performing the calculation of the first signing parameter directly on the user device.

In a second variant embodiment, the step of obtaining the first signing parameter T of the signing method according to the first aspect can comprise a transmission step by the interface means of the user device of the first determined random integer a to a remote processing device and a reception step by the interface means of the user device of the first signing parameter T calculated by the remote processing device and equal to $Ah^a$.

This allows diminishing the quantity of calculations made by the user device.

In a first embodiment, the step of obtaining the third signing coefficient $R_3$ of the signing method according to the first aspect can comprise a calculation step of the third signing coefficient $R_3$ performed by the processing means of the user device.

This allows limiting quality the number of data to be exchanged by performing the calculation of the third signing parameter directly on the user device.

In a second embodiment, the step of obtaining the third signing coefficient $R_3$ of the signing method according to the first aspect can comprise:
  a calculation step by the processing means of the user device of a fourth signing coefficient $B_1$ equal to $A^{r\_x} h^{a.r\_x - r\_f - r\_b}$ and of a fifth signing coefficient $B_2$ equal to $h^{-r\_a}$,
  a transmission step by the interface means of the user device of said fourth and fifth signing coefficients $B_1$ and $B_2$ to a remote processing device, a reception step by the interface means of the user device of the third signing coefficient $R_3$, said third signing coefficient $R_3$ being calculated by the remote processing device and equal to $e(B1, g_2)e(B2,w)$.

This diminishes allows diminishing the quantity of calculations made by the user device.

In a third embodiment, the step for obtaining the third signing coefficient $R_3$ of the signing method of according to the first aspect can comprise:

a calculation step by the processing means of the user device of a sixth signing coefficient B equal to $A^{r\_x}\_ h^{a.r\_x-r\_f-r\_b}$, a transmission step by the interface means of the user device of the sixth signing coefficient B and of the second determined random integer r_a to a remote processing device, a reception step by the interface means of the user device of the third signing coefficient $R_3$, said third signing coefficient $R_3$ being calculated by said remote processing device and equal to $e(B, g_2) W^{-r\_a}$.

This allows diminishing the quantity of calculations made by the user device.

The signing method according to the first aspect can also comprise a reception step, by the interface means of the user device, of the domain parameter dpk, the domain parameter dpk being generated by a key-managing authority and equal to $g_1^r$ with r a random modular integer.

This allows deterministically generating a pseudonym specific to a user and specific to a service provider.

A key managing authority also able to play the role of managing authority for at least two service provider domains, a domain of a service provider comprising a set of terminals in communication with a server of said service provider, the signing method according to the first aspect can comprise a reception step, by the interface means of the user device, of the domain parameter $dpk_j$ specific to a domain Dj of a service provider $FS_j$, the domain parameter dpkj being generated by the key-managing authority and equal to $g_1^{r_j}$ with $r_j$ a random modular integer, said generated pseudonym allowing identifying the user of said user device in the domain $D_j$ and said generated signature allowing signing a message in the domain $D_j$.

This allows the user to be identified by a particular pseudonym on each domain, deterministically, but without anyone except the managing authority being able to determine whether two pseudonyms in two different domains can belong to the same user.

The present invention according to a second aspect relates to a signature control method of a message m and a pseudonym, said signature σ and said pseudonym nym being generated in accordance with the method according to the first aspect, said control method comprising the following steps implemented by processing means of a control server:

calculating a first control coefficient $R'_1$ equal to $h^{s\_f}dpk^{s\_x}nym^{-c}$, calculating a second control coefficient $R'_2$ equal to $nym^{s\_a}h^{-s\_a}dpk^{-s\_b}$, calculating a third control coefficient $R'_3$ equal to $e(T,g_2)^{s\_x} V^{-s\_f-s\_b} W^{-s\_a}[e(g_1,g_2)e(T,w)^{-1}]^{-c}$, calculating a control parameter c' by applying the hash function H to the public domain parameter dpk, the pseudonym nym, the first signing parameter T, the first, second and third control coefficients $R_1$, $R_2$, $R_3$ and the message m, comparing of the second signing parameter c and of the control parameter c', said signature being valid in case of equality of the second signing parameter c and of the control parameter c';

This allows the control server to verify that the signature controlled has been generated by the legitimate user holder of the pseudonym supplied with the signature.

The processing means of the control server can also verify that the pseudonym nym of the user does not belong to a revocation list RL, said revocation list being built from pseudonyms of revoked users nym.

Such use of revocation lists allows excluding a user from one or more domains by communicating his pseudonym to the control server.

The present invention relates according to a third aspect to a computer program comprising program code instructions for execution of the steps of the method according to the first aspect when said program is executed on a computer.

The present invention relates, according to a fourth aspect, to a user device comprising at least storage means, processing means and communication interface means characterized in that it is configured to implement a signing method according to the first aspect.

The present invention relates, according to a fifth aspect, to a chip card comprising a user device according to the fourth aspect.

The present invention relates, according to a sixth aspect, to a control server comprising at least storage means, processing means and interface means and configured to implement a control method according to the second aspect.

The present invention relates, according to a seventh aspect, to a system comprising at least one user device according to the fourth aspect and at least one control server according to the sixth aspect.

Such computer program products, devices and systems have the same advantages as those mentioned for the methods according to the first aspect and the second aspect.

DESCRIPTION OF FIGURES

Other characteristics and advantages will further emerge from the following description which is purely illustrative and nonlimiting and must be considered with respect to the appended figures, in which.

DETAILED DESCRIPTION OF AT LEAST ONE EMBODIMENT

System

Figure 1:
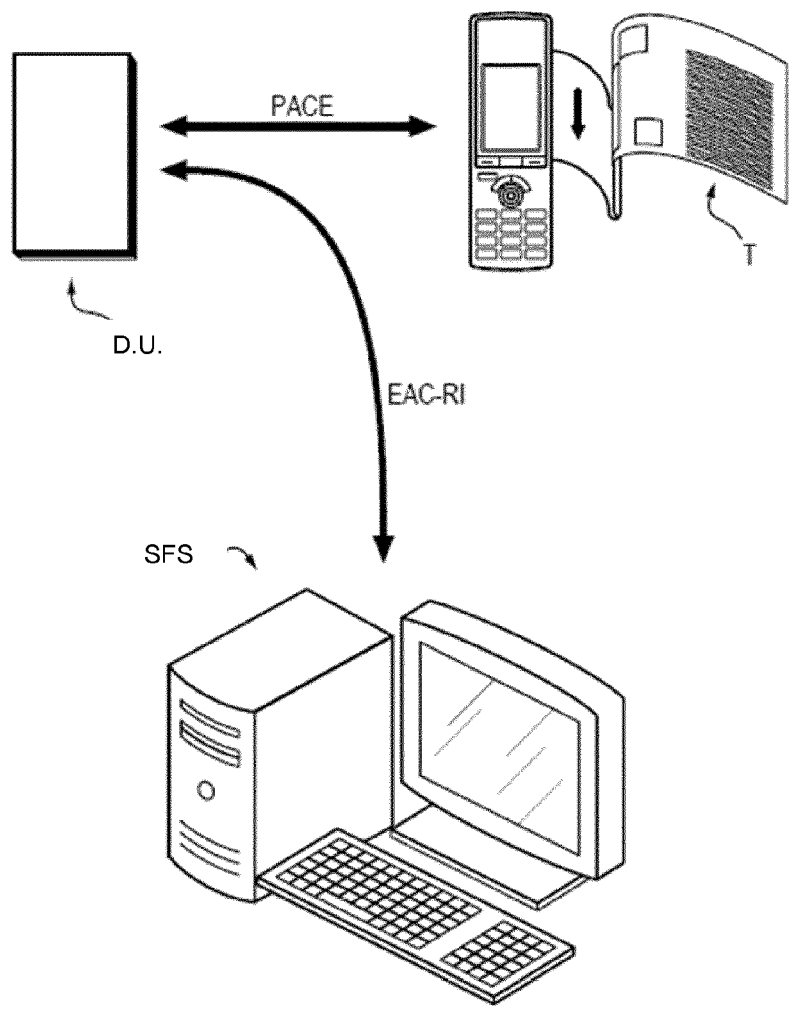
FIG. 1 illustrates advanced security mechanisms for MRTD.
Figure 2:
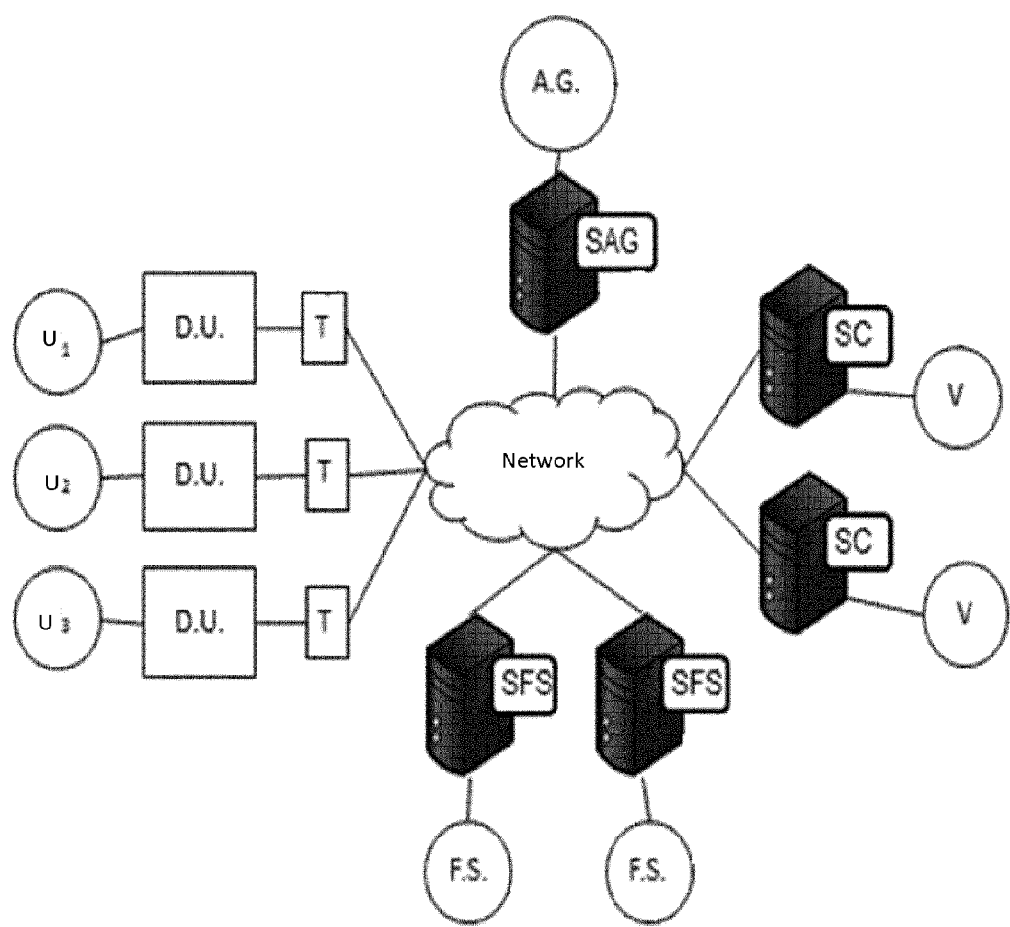
FIG. 2 is a schematic representation of an example of system for implementing the methods according to the invention.

A system such as illustrated in FIG. 2 comprises a set of user devices DU each held by a user, reading terminals T, a key-managing authority AG, service providers FS and verifiers V which can be service providers.

The set of user devices, the reading terminals, the key-managing authority, the service providers and the verifiers are interconnected by means of a computer network. A set of terminals of this network in communication with a service provider constitutes a domain.

The key-managing authority, the service providers and the verifiers can be connected to this network by respective servers comprising a RAM and storage means such as rewritable non-volatile memory (flash memory or EEPROM memory) which can store a database, processing means comprising a processor, cryptographic units for generating especially random numbers, etc. . . . and interface means allowing them to communicate with other entities on the network and be connected to databases. Such servers can also comprise input and user interface means for their administration. The servers of the above entities are respectively named key management server SAG, service provider server SFS, and control server SC in the following.

At least two of these servers can be gathered within a same computer device jointly ensuring the functions of said servers.

The user device of a user can be included in a portable electronic device capable of secure storing data readable by a reading terminal.

An electronic device can be an identity document comprising a chip on which are stored secure data for example a travel document readable by machine (Machine Readable Travel Document, MRTD) such as a passport or an identity card, a flash memory storage device provided with a USB communication interface, called USB key ("Universal Serial Bus"), a chip card etc. . . . .

The user device can comprise a RAM and storage means such as rewritable non-volatile memory (flash memory or EEPROM memory), processing means comprising a processor, cryptographic units for generating especially random numbers etc. . . . . The user device can also comprise interface means such as a communication interface without contact of the type RFID or NFC interface, or else a wireless communication interface of the type Bluetooth or Wifi interface.

The stored secure data can be biometric data. In this case, the portable device or the user device can be provided with sensors allowing capturing the biometric data of a user, such as his fingerprints, palm prints or retinal prints.

A user device and a reading terminal can communicate by means of wireless or contactless communications such as those mentioned hereinabove. They can also communicate by means of a USB interface, Firewire or any other wired communication interface. They can also communicate by means of an interface with chip card contact of ISO 7816 type.

A reading terminal can also comprise a wired or wireless communication interface, adapted for connection of the terminal to the computer network, such as an Ethernet, Wifi or 3G interface; and a user interface allowing the user to control its operation.

According to a variant, a user device and a reading terminal can be gathered in the same electronic device comprising communication interface and user interface means similar to those described hereinabove.

In the following description, operations for calculating the signature can be delegated to a remote processing device which can be the reading terminal or any other remote device connected to the user device and comprising processing means with sufficient calculation power to carry out these operations.

The network connecting the user devices and the servers by way of example consists of a local Ethernet network, a local wireless network, the Internet network, a mobile telephony network . . . . The communications on this network can be secure, especially by encrypting exchanged data.

Figure 3A:
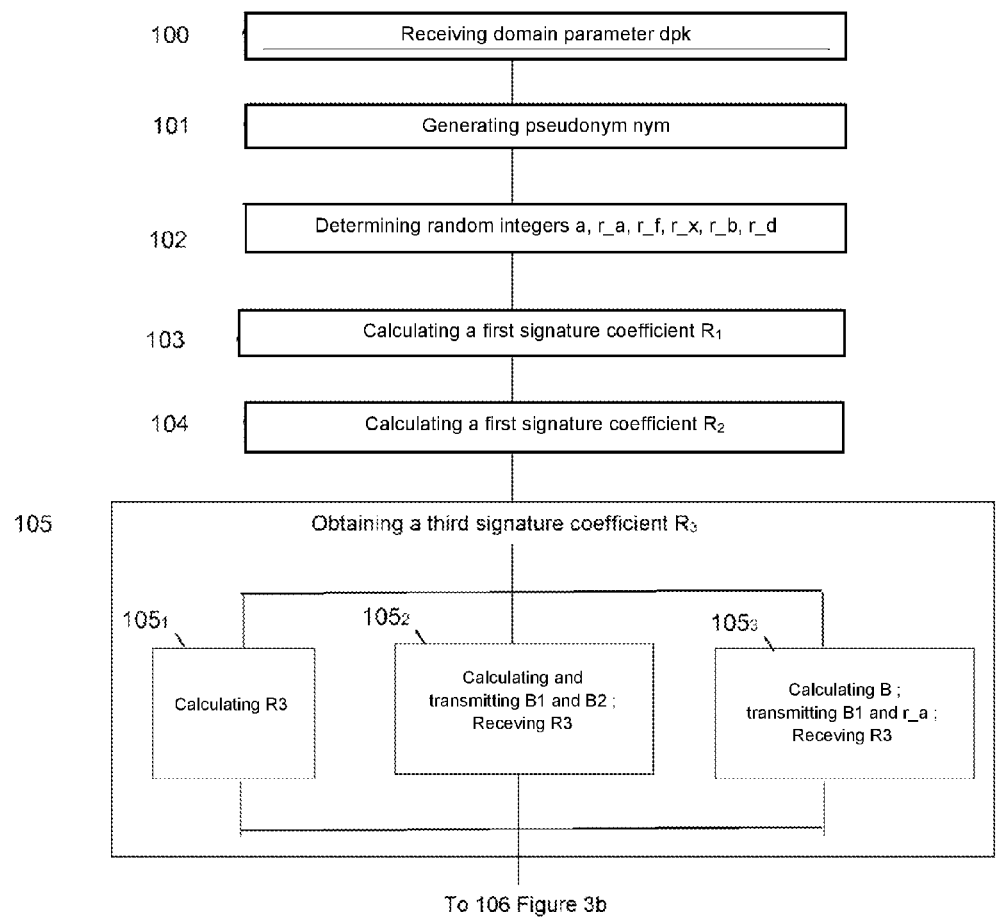
FIGS. 3a and 3b form a flowchart representing the steps of a signing method according to an embodiment of the invention.
Figure 3B:
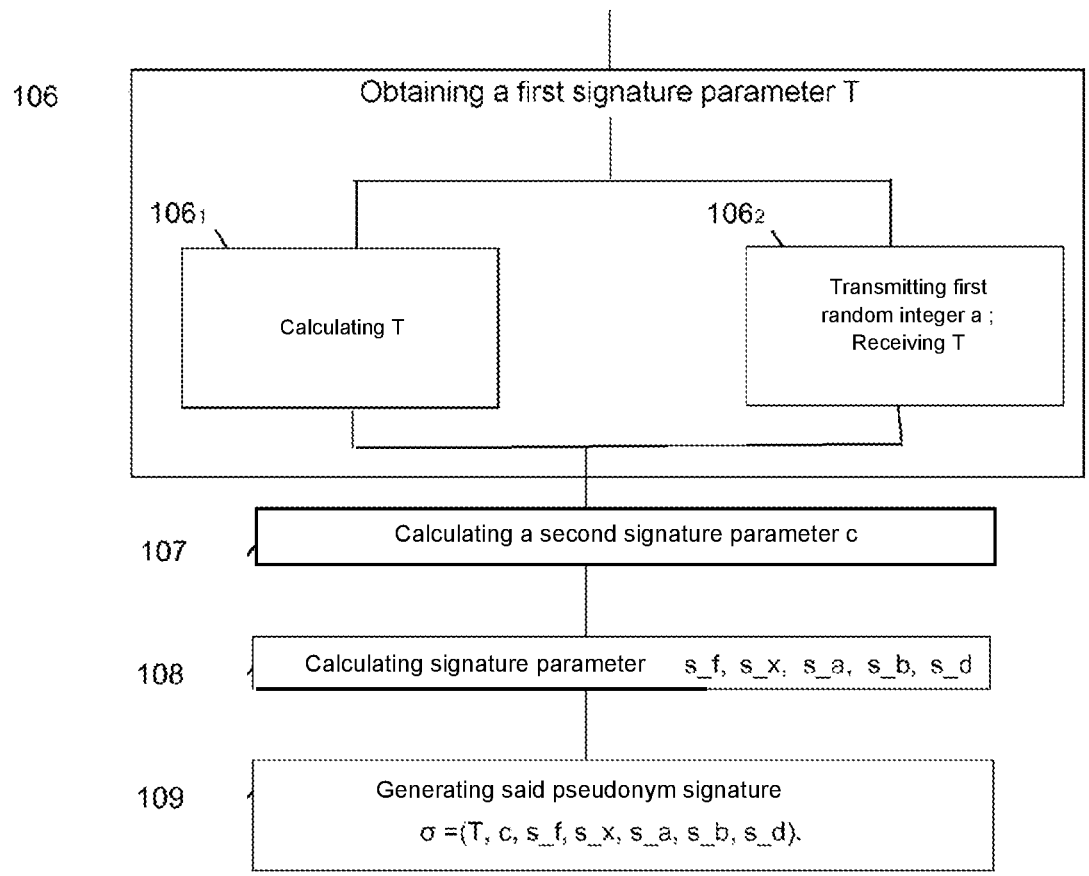

The steps of the signing method implemented by a user device DU of those described in the following paragraphs are represented in the flowcharts of FIGS. 3a and 3b.

Generation of Keys

The signing method can comprise a key generation phase implemented by the key management server SAG.

In this key generation phase, the processing means of the management server generate a set of public parameters gpk and a modular integer constituting a secret management key $\gamma$. Said management key $\gamma$ can by way of example belong to $Z_p$, the body of the modulo relative integers p, with p being a prime number.

The management server can also determine a domain parameter dpk, or $dpk_j$ specific to the domain $D_j$ of a service provider $SFS_j$ when the key managing authority plays the role of managing authority for at least two service provider domains, a service provider domain comprising a set of terminals in communication with a server of said service provider. The management server then sends the domain parameter via its interface means to the server of the service provider SFS or to the service provider $SFS_j$ belonging to the domain $D_j$. As a variant, the service providers $SFS_j$ can generate these domain parameters themselves.

The public parameters gpk are then made public. The domain parameter $dpk_j$ can also be made public.

More precisely, in an embodiment of the invention, during this key generation phase the processing means of the key management server:

determine groups $G_1$, $G_2$, $G_T$ which can by way of example be bilinear of prime-order p and a bilinear application of $G_1 \times G_2$ in $G_T$ which can be a bilinear and nondegenerated form of $G_1 \times G_2$ in $G_T$, randomly generate first and second elements of the group $G_1$ $g_1$ and h, for example generators of the group $G_1$, and an element $g_2$ of the group $G_2$, $g_2$ which can be for example a generator of the group $G_2$, randomly generate a modular integer $\gamma$ constituting the secret management key, wherein $\gamma$ can belong to $Z_p$, and can calculate a parameter w which can be equal to $g_2^\gamma$, determine a cryptographic hash function H From these elements, the key management server can generate the set of public parameters gpk=(p, $G_1$, $G_2$, $G_T$, e, h, $g_2$, w, H).

The key management server can also previously calculate a second coupling result V equal to e(h, $g_2$) and a third coupling result W equal to e(h,w). These second and third coupling results can be included in the set of public parameters gpk.

The secret management key $\gamma$ does not form part of the public parameters gpk, and is held by the managing authority only. The difficulty in executing the algorithm of the discrete logarithm for a selected group $G_2$ ensures the practical impossibility of recovering the secret management key $\gamma$ from w. In this way diffusion of w in the set of public parameters gpk poses no security problem of the signature mechanism.

For each service provider FS (or $FS_j$ specific to the domain $D_j$ if there are several domains), the key management server generates a domain parameter dpk (or $dpk_j$). This parameter can be a function of a modular integer r (or $r_j$) which can belong to $Z^*_p$. By way of example this parameter can be equal to $g_1^r$ (or $g_1^{r_j}$). The integer r (or $r_j$) can be randomly generated by the management server by means of its cryptographic unit. The management server then transmits this parameter via its interface means to the server of the service provider FS (or $FS_j$).

The public parameters gpk and if needed the domain parameter dpk or $dpk_j$ can be made public in various ways. They can be sent by the service providers FS to the control servers SC and to the user devices D.U or published on a service provider site, said user devices receiving them during a reception step 100.

Registration of a New User

Figure 4:
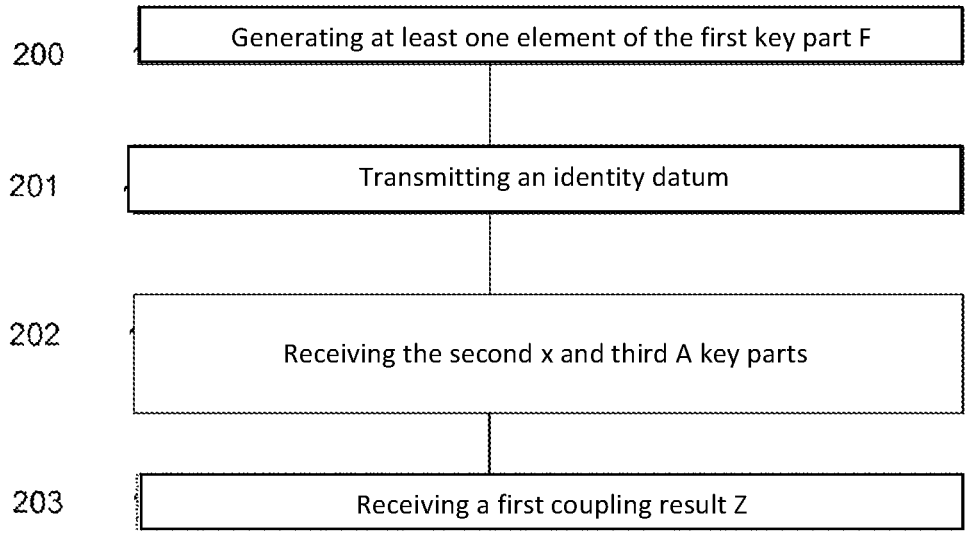
FIG. 4 is a flowchart representing the steps of a registration phase of a new user according to an embodiment of the invention.

The signing method can also comprise a phase called registration of a new user Ui with the key-managing authority AG, consisting of creating a secret signature key sk for the user Ui, illustrated in FIG. 4.

To do this, the new user Ui can generate, by means of the processing means of its user device DU at least one first element of a first unknown key part of the key-managing authority AG during a generation step 200, transmit an identity datum during a transmission step 201 by the interface means of its user device, calculated by these processing means from at least this first element of this first key part, to the key management server SAG and prove to the key-managing authority by means of this identity datum that it holds at least said first element of the first key part by zero knowledge proof algorithm. The key management server then generates and then transmits to the new user the missing key part forming with the first key part the signature key of the new user, which receives this missing key part during a reception step 202.

More precisely, in a first embodiment of the invention during this registration phase:

The processing means of the user device of the new user determine a modular integer f' constituting a first element f' of the first key part f, such a first element f' can by way of example belong to $Z_p$, calculate identity data F' equal to $h^{f'}$, calculate zero knowledge proof π of the first element f' of the first key part f, and transmit F' and π to the key management server.

The processing means of the key management server verify π. If this verification is positive, the new user has in fact brought to the managing authority the proof that it holds the first element f' of the first key part f without divulging it. The processing means of the key management server then randomly generate a modular integer constituting a second key part x and a modular integer constituting a second element f" of the first key part f then calculate a number F equal to F' $h^{f''}$ and a third key part A equal to $(g_1 F)^{1/(x+\gamma)}$.

The interface means of the management server can transmit to the user device the second element f", the second and third key part x and A by using a preferably secure channel.

The processing means of the user device calculate the first key part f from the first and second elements of first key part; this first key part can for example be equal to f'+f".

Optionally, the processing means of the user device verify that $e(A, g_2^x w) = e(g_1 h^f, g_2)$.

The last optional verification allows the member to verify that the second and third key parts A and x as well as the second element f" of the first key part f which have been sent to the latter have not been corrupted and are valid, that is, verify the equation $A=(g_1 F)^{1/(x+\gamma)}$.

The proof π calculated by the processing means of the user device can be a noninteractive zero knowledge proof of equality of discrete logarithm. This proof can especially implement a double commitment to prove the knowledge of the first element f' of the first key part f. The proof π then comprises, in addition to a first encrypted proof value, an additional commitment value C calculated from the first element f' of the first key part f by an extractable commitment scheme, such as a commitment scheme perfectly binding and computationally masking having an extraction key for extracting the commitment value.

Such an embodiment allows jointly generating the first key part f by the key management server and by the user device to reinforce the security of this registration phase.

In a second embodiment of the invention, methods similar to those described hereinabove are implemented during this registration phase but the first key part f is entirely determined by the processing means of the user device. The zero knowledge proof transmitted by the user device to the key management server serves to prove the knowledge of all of the first key part f. The interface means of the management transmit send to the user device only the second x and third A key parts. This allows limiting the quantity of information to be exchanged between the key management server and the user device and avoiding making some calculations on both these items of equipment.

In such embodiments of the invention, the new user is the only one to know the entirety of his signature key constituted by first, second and third key parts. Nobody, not even the key-managing authority can accordingly sign a message in place of the new user.

By way of option, during execution of this registration phase, the managing authority sends a first coupling result Z equal to $e(A, g_2)$ to the new user who receives it during a reception step 203 to prevent the user device of the latter having to later take charge of calculating a coupling result during calculation of the signature.

The signature key of the new user and the first coupling result Z can be stored in secure storage means of the user device belonging to the new user, for example in the non-volatile memory of the corresponding portable electronic device.

Similarly, the second and third key parts can be stored by the key management server, for example within a database registered in the storage means of the key management server or else connected to the latter.

According to a variant of the invention, the first key part f or the first element f' of the first key part is calculated from a biometric datum of the new user captured by the sensors of the portable electronic device or of the user device or else stored by one of the latter. The first key part f or the first element f' of the first key part can also be the result of application by the processing means of the portable electronic device of a hash function with such a biometric datum.

Generation of Pseudonym

The signing method can also comprise a generation step 101 of a pseudonym identifying the user of the user device DU.

This pseudonym is a function of the domain parameter dpk and of the second key part and can be equal to $h'dpk^x$.

In the case of multiple domains, with the pseudonym of the user in the domain $D_j$ being formed from the domain parameter $dpk_j$ specific to the domain Dj, the user has different pseudonyms in separate domains. It is then impossible for service providers FS or verifiers V to determine whether two messages in two separate domains having different signatures and pseudonyms have been signed by the same member ("cross-domain unlinkability").

Generation of Signature

The signing method comprises a signing phase of a message m. This signing phase can be done for example within the scope of RI protocol (Restricted Identification).

The message m can be a challenge previously transmitted by a control server SC to the user device or any type of message to be signed by the user of the user device DU. The control server can also transmit to the user device the domain parameter dpk (or dpkj), if the latter has been made public or is not already known to said user.

In a first embodiment of the signing phase, the processing means of the user device conduct the following steps:

determining 102 first, second, third, fourth, fifth and sixth modular random integers a, r_a, r_f, r_x, r_b, r_d which can belong to $Z_p$, calculating 103 a first signing coefficient $R_1$ equal to $h^{r\_f}dpk^{r\_x}$, calculating 104 a second signing coefficient $R_2$ equal to $nym^{r\_a}h^{-r\_d}dpk^{-r\_b}$, obtaining 105 a third signing coefficient $R_3$ equal to $Z^{r\_x} V^{a.r\_x-r\_f-r\_b} W^{-r\_a}$, obtaining 106 a first signing parameter T equal to $Ah^a$, calculating 107 a second signing parameter c by applying a cryptographic hash function H, to the public domain parameter dpk, the pseudonym nym, the first signing parameter T, the first, second and third signing coefficients $R_1$, $R_2$, $R_3$ and the message m; said second signing parameter can for example be equal to $H(dpk\|nym\|T\|R_1\|R_2\|R_3\|m)$ with $\|$ the concatenation operation, calculating 108 third, fourth, fifth, sixth and seventh signing parameters s_f, s_x, s_a, s_b, s_d, respectively equal to r_f+c.f, r_x+c.x, r_a+c.a, r_b+c.a.x and r_d+c.a.f, generating 109 said pseudonym signature σ of said message m from said signing parameters (T, c, s_f, s_x, s_a, s_b, s_d).

The signature σ is constructed such that the user of the user device can prove by signing a message or challenge that he has knowledge of the secret signature key sk without divulging it, for example by a zero knowledge proof algorithm.

Also, by construction, the modular integer x, which constitutes a second part of a secret signature key is used both for calculating the signature σ of the message m and for generating the pseudonym nym used by the user of the user device. This allows linking them and thus being able to prove from the signature and the pseudonym that the user knows the second key part x without revealing the latter and that the user identified by the pseudonym constructed from this second key part x is in fact the legitimate signatory of the message m.

In a variant of this first embodiment, the first coupling result Z can be calculated prior to the step of obtaining the third signing coefficient $R_3$.

The first coupling result Z can thus be calculated by the processing unit of the management server of the key-managing authority prior to implementing the signing phase, for example during the registration phase before being transmitted to the user device which receives it during a reception step 203. This allows alleviating for the user device and accelerating the calculation of the coupling result, the management server benefiting from more calculation power than the user device.

In the same way the second and third coupling results V and W can be calculated prior to the step of obtaining the third signing coefficient $R_3$.

The second and third coupling results V and W can for example be public parameters generated by the managing authority and belong to the set of generated public parameters gpk.

Thus in this variant, the user device performs all the calculations for generating the signature in the groups G1 and GT but carries out no operations in the group G2 and does not calculate couplings which are the costliest operations in terms of calculation power and are very rarely embedded on chip cards. So in the case of a chip for example embedded in an MRTD identity document readable by a reading terminal, the chip carries out only the less expensive operations in terms of calculation power and the reading terminal is content to transfer messages between the chip and the service provider.

The step of obtaining the first signing parameter T can comprise a calculation step of the first signing parameter T 106₁ implemented by the processing means of the user device.

Alternatively, the step of obtaining the first signing parameter T can comprise a transmission step 106₂ via the interface means of the user device of the first determined random integer a to a remote processing device which can be a reading and reception terminal via the interface means of the user device of the first signing parameter T calculated by the remote processing device and equal to $Ah^a$. This allows using the calculation power of the remote processing device and levitating the calculations performed in the user device.

In a first embodiment, the step of obtaining the third signing coefficient $R_3$ can comprise a calculation step of the third signing coefficient $R_3$ 105₁ performed by the processing means of the user device by means of the first, second and third coupling results Z, V, W obtained according to the different variants presented hereinabove.

In a second embodiment, the step of obtaining the third signing coefficient $R_3$ can comprise a step 105₂:

of calculating by the processing means of the user device of a fourth signing coefficient $B_1$ equal to $A^{r\_x}h^{a.r\_x-r\_f-r\_b}$ and a fifth signing coefficient $B_2$ equal to $h^{-r\_a}$, of transmitting via the interface means of the user device of said fourth and fifth signing coefficients $B_1$ and $B_2$ to a remote processing device which can be a reading terminal, of receiving by the interface means of the user device of the third signing coefficient $R_3$, said third signing coefficient R3 being calculated by the remote processing device and equal to $e(B1, g_2)e(B2,w)$.

In a third embodiment, the step of obtaining the third signing coefficient $R_3$ can comprise a step 105₃:

of calculating by the processing means of the user device of a sixth signing coefficient B equal to $A^{r\_x}h^{a.r\_x-r\_f-r\_b}$, of transmitting via the interface means of the user device of the sixth signing coefficient B and of the second determined random integer r_a to a remote processing device, of receiving by the interface means of the user device of the third signing coefficient $R_3$, said third signing coefficient $R_3$ being calculated by said remote processing device and equal to $e(B, g_2)W^{-r\_a}$.

According to these second and third embodiments, the user device performs operations in a single group only and exponentiations only. Moreover, the costliest calculations are performed by the remote processing device, the latter having calculation power greater than the user device without the user device revealing the secret key of the user so as to be protected from a malicious reading terminal.

On completion of this signing phase, the user device DU transmits via its communication interface means, and optionally through the reading terminal T, the signature σ obtained and the pseudonym corresponding to the user of the user device to the control server SC which has sent it the challenge to be signed, or else to the recipient of the message m to which it also sends the message m.

For a high level of security equivalent to the level offered by a key RSA of 3072 bits, the signature σ and the pseudonym obtained together weigh 2 Kbits. In the embodiments delegating the calculation of some elements of the signature to a remote processing device, the user device sends a few tens of bits of data to the remote processing device which then sends back around 3 Kbits of data.

Control of Signing

Figure 5:
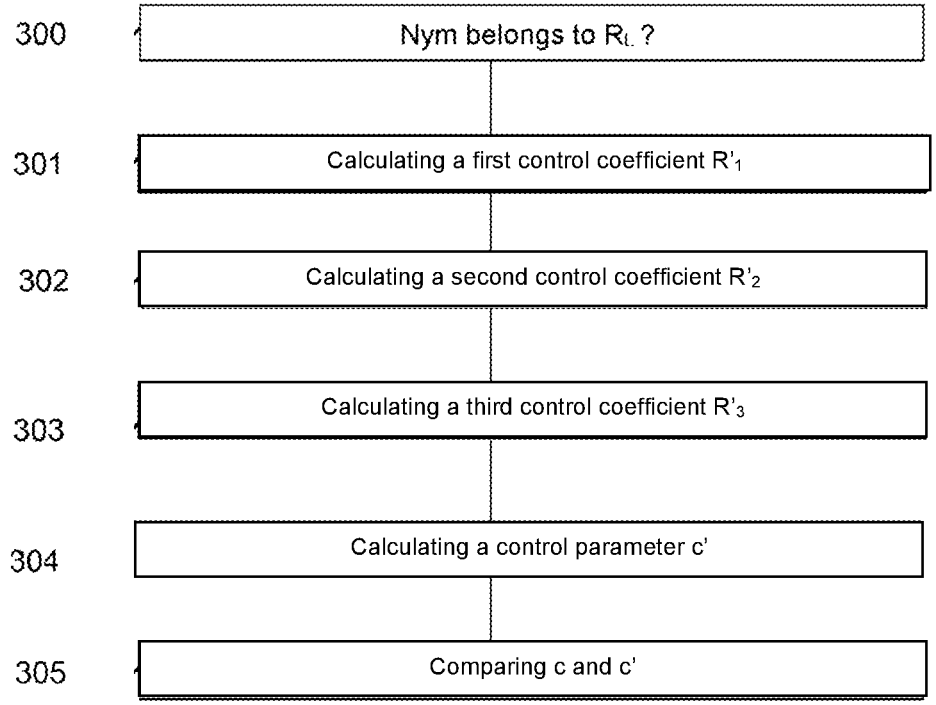
FIG. 5 is a flowchart representing the steps of a signature control method according to an embodiment of the invention.

To control the signing σ of a message m and of a pseudonym nym generated according to the signing method described hereinabove, processing means of a control server SC can execute a signature control method which comprises the following steps, illustrated in FIG. 5:

- a calculation step 301 of a first control coefficient $R'_1$, with $R'_1$ equal to $h^{s\_f} dpk^{s\_x} nym^{-c}$,
- a calculation step 302 of a second control coefficient $R'_2$, with $R'_2$ equal to $nym^{s\_a} h^{-s\_d} dpk^{-s\_b}$,
- a calculation step 303 of a third control coefficient $R'_3$, with $R'_3$ equal to $e(T,g_2)^{s\_x} V^{-s\_f-s\_b} W^{-s\_a} [e(g_1,g_2) e(T,w)^{-1}]^{-c}$,
- a calculation step 304 of a control parameter c' by applying the hash function H to the public domain parameter dpk, the pseudonym nym, the first signing parameter T, the first, second and third control coefficients $R_1$, $R_2$, $R_3$ and to the message m; c' can for example be equal to $H(dpk\|nym\|T\|R'_1\|R'_2\|R'_3\|m)$,
- a comparison step 305 of the second signing parameter c and of the control parameter c', said signature being valid in case of equality of the second signing parameter c and of the control parameter c'.

This signature control method controls, from the signature σ and the pseudonym nym, that the user has knowledge of the secret signature key sk, and that the pseudonym and the signature of the user are linked, that is, that said pseudonym and said signature are a function of a part of said secret signature key. If this verification is positive, the pseudonym received with the signature is that of the signatory.

To verify the signature of a message m and the pseudonym of the user holding the user device, the control server needs only to know this signature and this pseudonym as well as the domain parameters dpk and the public parameters gpk. The control server especially has no knowledge of the secret signature key of the user. For this reason no control server can sign a message in place of the user, or know the pseudonym of the user in several domains and link the signatures and pseudonyms of this user for different domains. For this reason it is impossible to say whether or not they correspond to the same user when two pseudonyms for two different domains are observed.

Revocation

Users who can log on or exit the system at different instants or else users who can lose their capacity to sign, a revocation mechanism can be put in place so that logged-on users can be revoked later, either in the whole system, that is, in all domains, or in a sub-set of domains.

A revocation list can be set up for each domain and updated by the managing authority AG.

Such a revocation list $RL_j$ for the domain Dj is built from pseudonyms $nym_j$ of revoked users and is stored in a revocation database $BD_j$.

To do this, when a domain is created such an initially empty revocation list can be created for this domain. This list can be created as the same time as the domain parameter dpkj.

During the registration phase, the managing authority can store in a revocation table a revocation token rt associated with the new logged-in user as a function of the second key part x and of the number F calculated, for example equal to the couple (F, x).

According to a first embodiment, when the managing authority wants to revoke a user in a domain $D_j$, the management server SAG retrieves the revocation token rt stored in the revocation table and transmits it to the server $SFS_j$ of the service provider $FS_j$. The server of the service provider $SFS_j$ calculates the corresponding pseudonym $nym_j$, equal to $F(dpk_j)^x$, and adds it to the revocation list $RL_j$ of the revocation database $BD_j$.

According to a second embodiment, when the managing authority AG wants to revoke a user in a set of domain Dj, the management server SAG retrieves the revocation token rt associated with the user stored in the revocation table and the domain parameter $dpk_j$, generates auxiliary information corresponding to the pseudonym $nym_j$ of the user equal to $F(dpk_j)^x$ and transmits it to each server $SFS_j$ of the service provider $FS_j$. Each server of the service provider $FS_j$ adds the pseudonym $nym_j$ to the revocation list $RL_j$ of the revocation database $BD_j$.

This allows avoiding transmitting part of the secret key of the user to the network.

According to a third embodiment, revocation of a user can be at the initiative of a service provider $FS_j$. A server $SFS_j$ of the service provider $FS_j$ adds the pseudonym of the user it wants to revoke to the revocation list $RL_j$ of the revocation database $BD_j$.

The control method can also comprise a revocation verification step 300 consisting of verifying that the user has not been revoked in the set of domains or in a sub-set of domains.

To do this, the processing means of the control server SC verify in the revocation database $BD_j$ that the pseudonym $nym_j$ of the signatory does not belong to the revocation list $RL_j$.

In an embodiment if the control server determines that the user has been revoked, it does not implement the steps of the control method described hereinabove and therefore does not verify the validity of the signature.

On the other hand, the revocation list is not taken into account during signing. This allows not having to renew the keys of valid users after revocation of a user and involving no additional calculations for the signatory.

Moreover, during the verification step of the revocation of a user, the processing means of the control server have only one test for belonging to a list to be performed and not a linear number of arithmetic operations as in the signature mechanisms of known groups.

According to a variant of the invention, lists of valid users are used instead of revocation lists. During the revocation verification step 300, the control server then verify that the pseudonym of the user belongs to the list of valid members.

The storage databases of these lists can be stored on the service provider servers. According to a variant, these lists can be stored in a common database stored on the key management server.

Thus such a pseudonym signing methods allowing a user to authenticate to a service provider while having a level of security at least as high as that of the signature methods of the prior art can be implemented on chip cards having low calculation power and especially on existing chip cards.

The invention claimed is:

1. A pseudonym signing method of a message by a user device comprising processing means, interface means and storage means,
the storage means of said user device storing a secret signature key function at least:
of a modular integer f constituting a first key part,
of a modular integer x constituting a second key part,
of a third key part A equal to $(g_1 h^f)^{1/(x+\gamma)}$ with:
$g_1$ and h first and second elements of a group $G_1$, said first and second elements $g_1$ and h of the group $G_1$ being public parameters and,
$g_2$ an element of a group $G_2$, said element $g_2$ of the group $G_2$ being a public parameter,
$\gamma$ a modular integer constituting a secret management key, such as w equal to $g_2^\gamma$ with w a public parameter,
and comprising the following steps implemented by the processing means of said user device:
generating a pseudonym nym identifying the user of said user device and equal to $h^f dpk^x$, with dpk a public domain parameter,
determining first, second, third, fourth, fifth and sixth modular random integers a, r_a, r_f, r_x, r_b, r_d,
calculating a first signing coefficient $R_1$ equal to $h^{r\_f} dpk^{r\_x}$,
calculating a second signing coefficient $R_2$ equal to $nym^{r\_a} h^{-r\_d} dpk^{-r\_b}$,
obtaining a third signing coefficient $R_3$ equal to $Z^{r\_x} V^{a.r\_x - r\_f - r\_b} W^{-r\_a}$,
with Z, V and W of first, second and third coupling results respectively equal to $e(A, g_2)$, $e(h, g_2)$ and $e(h,w)$,
and e a bilinear application of $G_1 \times G_2$ in a group $G_T$, said application e being a public parameter,
obtaining a first signing parameter T equal to $Ah^a$,
calculating a second signing parameter c by applying a cryptographic hash function H to the public domain parameter dpk, the pseudonym nym, the first signing parameter T, the first, second and third signing coefficients $R_1$, $R_2$, $R_3$ and the message m,
calculating third, fourth, fifth, sixth and seventh signing parameters s_f, s_x, s_a, s_b, s_d, respectively equal to r_f+c.f, r_x+c.x, r_a+c.a, r_b+c.a.x and r_d+c.a.f,
generating said pseudonym signature of said message from said signing parameters.

2. The pseudonym signing method according to claim 1, comprising a generation step of at least one element of the first key part by the processing means of the user device, a transmission step by the interface means of the user device of an identity datum generated from said at least one generated element of said first key part, so as to prove, by a proof algorithm with zero knowledge proof, to a key-managing authority the knowledge by the user device of said at least one generated element of the first key part, a reception step by the interface means of the user device of second and third key parts generated by the key-managing authority.

3. The pseudonym signing method according to claim 1, wherein the first coupling result and/or the second and third coupling results are calculated prior to the step of obtaining the third signing coefficient.

4. The pseudonym signing method according to claim 1, wherein the second and third coupling results are public parameters.

5. The pseudonym signing method according to claim 1, comprising a reception step, by the interface means of the user device, of the first coupling result calculated by a processing unit of a management server of a key-managing authority.

6. The pseudonym signing method according to claim 1, wherein the step of obtaining the first signing parameter comprises a calculation step of the first signing parameter performed by the processing means of the user device.

7. The pseudonym signing method according to claim 1, wherein the step of obtaining the first signing parameter comprises a transmission step by the interface means of the user device of the first determined random integer to a remote processing device and a reception step by the interface means of the user device of the first signing parameter calculated by the remote processing device and equal to $Ah^a$.

8. The pseudonym signing method according to claim 1, wherein the step of obtaining the third signing coefficient comprises a calculation step of the third signing coefficient implemented by the processing means of the user device.

9. The pseudonym signing method according to claim 1, wherein the step of obtaining the third signing coefficient comprises:
a calculation step by the processing means of the user device of a fourth signing coefficient $B_1$ equal to $A^{r\_x} h^{a.r\_x - r\_f - r\_b}$ and a fifth signing coefficient $B_2$ equal to $h^{-r\_a}$,
a transmission step by the interface means of the user device of said fourth and fifth signing coefficients $B_1$ and $B_2$ to a remote processing device,
a reception step by the interface means of the user device of the third signing coefficient, said third signing coefficient being calculated by the remote processing device and equal to $e(B1, g_2)e(B2,w)$.

10. A signing method according to claim 1, wherein the step of obtaining the third signing coefficient comprises:
a calculation step by the processing means of the user device of a sixth signing coefficient B equal to $A^{r\_x} h^{a.r\_x - r\_f - r\_b}$,
a transmission step by the interface means of the user device of the sixth signing coefficient B and of the second determined random integer to a remote processing device,
a reception step by the interface means of the user device of the third signing coefficient,
said third signing coefficient being calculated by said remote processing device and equal to $e(B, g_2)W^{-r\_a}$.

11. A control method of signing a message and a pseudonym, said signature and said pseudonym being generated according to the method of claim 1, said control method comprising the following steps implemented by processing means of a control server:
calculating a first control coefficient $R'_1$ equal to $h^{s\_f} dpk^{s\_x} nym^{-c}$,
calculating a second control coefficient $R'_2$ equal to $nym^{s\_a} h^{-s\_d} dpk^{-s\_b}$,
calculating a third control coefficient $R'_3$ equal to $e(T,g_2)^{s\_x} V^{-s\_f - s\_b} W^{-s\_a} [e(g_1,g_2)e(T,w)^{-1}]^{-c}$,
calculating a control parameter c' by applying a hash function H to a public domain parameter, the pseudonym, a first signing parameter, the first, second and third control coefficients and the message, comparing a second signing parameter and the control parameter, said signature being valid in case of equality of the second signing parameter and of the control parameter;

with:
f a modular integer constituting a first key part, x a modular integer constituting a second key part, A a third key part equal to $(g_1 h^f)^{1/(x+\gamma)}$, $g_1$ and h first and second elements of a group $G_1$, said first and second elements $g_1$ and h of the group $G_1$ being public parameters and, $g_2$ an element of a group $G_2$, said element $g_2$ of the group $G_2$ being a public parameter, $\gamma$ a modular integer constituting a secret management key, such as w equal to $g_2^\gamma$ with w a public parameter, e a bilinear application of $G_1 \times G_2$ in a group $G_T$, said application e being a public parameter, Z, V and W first, second and third coupling results respectively equal to $e(A, g_2)$, $e(h, g_2)$ and $e(h,w)$, a, r_a, r_f, r_x, r_b, r_d first, second, third, fourth, fifth and sixth modular random integers, T a first signing parameter equal to $Ah^a$, c a second signing parameter calculated by applying the cryptographic hash function H to the public domain parameter dpk, the pseudonym nym, the first signing parameter T, first, second and third signing coefficients $R_1$, $R_2$, $R_3$ and to the message m, where the first signing coefficient $R_1$ is equal to $h^{r\_x} dpk^{r\_x}$, the second signing coefficient $R_2$ is equal to $nym^{r\_a} h^{-r\_d} dpk^{-r\_b}$, the third signing coefficient $R_3$ is equal to $Z^{r\_x} V^{a.r\_x - r\_f - r\_b} W^{-r\_a}$, and s_f, s_x, s_a, s_b, s_d third, fourth, fifth, sixth and seventh signing parameters respectively equal to r_f+c.f, r_x+c.x, r_a+c.a, r_b+c.a.x and r_d+c.a.f.

12. A computer program comprising program code instructions for execution of the steps of the method according to claim 1 when said programme is executed on a computer.

13. A user device comprising at least storage means, processing means and communication interface means, wherein it is configured to implement a signing method according to claim 1.

14. A control server comprising at least storage means, processing means and interface means wherein it is configured to implement a control method according to claim 11.

15. A system comprising at least one user device including at least storage means, processing means and communication interface means, configured to implement a pseudonym signing method of a message by a user device comprising processing means, interface means and storage means, the storage means of said user device storing a secret signature key function at least:
of a modular integer f constituting a first key part,
of a modular integer x constituting a second key part,
of a third key part A equal to $(g_1 h^f)^{1/(x+\gamma)} g_1 . h^f)^{1/(x+\gamma)}$
with:
$g_1$ and h first and second elements of a group $G_1$, said first and second elements $g_1$ and h of the group $G_1$ being public parameters and, $g_2$ an element of a group $G_2$, said element $g_2$ of the group $G_2$ being a public parameter, $\gamma$ a modular integer constituting a secret management key, such as w equal to $g_2^\gamma$ with w a public parameter, and comprising the following steps implemented by the processing means of said user device:

generating a pseudonym nym identifying the user of said user device and equal to $h^f . dpk^x$, with dpk a public domain parameter, determining first, second, third, fourth, fifth and sixth modular random integers a, r_a, r_f, r_x, r_b, r_d, calculating a first signing coefficient $R_1$ equal to $h^{r\_f} dpk^{r\_x}$, calculating a second signing coefficient $R_2$ equal to $nym^{r\_a} h^{-r\_d} dpk^{-r\_b}$, obtaining a third signing coefficient $R_3$ equal to $Z^{r\_x} V^{a.r\_x - r\_f - r\_b} W^{-r\_a}$, with Z, V and W of first, second and third coupling results respectively equal to $e(A, g_2)$, $e(h, g_2)$ and $e(h,w)$, and e a bilinear application of $G_1 \times G_2$ in a group $G_T$, said application e being a public parameter, obtaining a first signing parameter T equal to $Ah^a$, calculating a second signing parameter c by applying a cryptographic hash function H to the public domain parameter dpk, the pseudonym nym, the first signing parameter T, the first, second and third signing coefficients $R_1$, $R_2$, $R_3$ and the message m, calculating third, fourth, fifth, sixth and seventh signing parameters s_f, s_x, s_a, s_b, s_d, respectively equal to r_f+c.f, r_x+c.x, r_a+c.a, r_b+c.a.x and r_d+c.a.f, generating said pseudonym signature of said message from said signing parameters, and at least one control server comprising at least storage means, processing means and interface means wherein said at least one control server is configured to implement a control method according to claim 11.

* * * * *